United States Patent
Bramnik et al.

(10) Patent No.: US 9,023,523 B2
(45) Date of Patent: May 5, 2015

(54) SYNTHESIS OF LITHIUM-IRON-PHOSPHATES UNDER HYDROTHERMAL CONDITIONS

(75) Inventors: Kirill Bramnik, Jersey City, NJ (US); Hartmut Hibst, Schriesheim (DE); Jordan Keith Lampert, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 749 days.

(21) Appl. No.: 13/257,137

(22) PCT Filed: Mar. 16, 2010

(86) PCT No.: PCT/EP2010/053326
§ 371 (c)(1),
(2), (4) Date: Sep. 16, 2011

(87) PCT Pub. No.: WO2010/106035
PCT Pub. Date: Sep. 23, 2010

(65) Prior Publication Data
US 2012/0012797 A1 Jan. 19, 2012

Related U.S. Application Data

(60) Provisional application No. 61/160,731, filed on Mar. 17, 2009.

(51) Int. Cl.
H01M 4/58 (2010.01)
C01B 25/30 (2006.01)
C01B 25/45 (2006.01)

(52) U.S. Cl.
CPC .............. *C01B 25/45* (2013.01); *H01M 4/5825* (2013.01)

(58) Field of Classification Search
USPC ................. 252/182.1; 429/218.1, 231.1, 221, 429/231.6, 231.9, 231.95; 423/311, 312
See application file for complete search history.

(56) References Cited

U.S. PATENT DOCUMENTS

| 6,702,961 | B2 | 3/2004 | Barker et al. | |
|---|---|---|---|---|
| 7,491,468 | B2 * | 2/2009 | Okada et al. | 429/221 |
| 7,524,529 | B2 * | 4/2009 | Yang | 427/213 |
| 2003/0082454 | A1 | 5/2003 | Armand et al. | |
| 2006/0257307 | A1 | 11/2006 | Yang | |
| 2008/0008938 | A1 | 1/2008 | Wu et al. | |
| 2008/0241043 | A1 | 10/2008 | Barker et al. | |
| 2009/0117022 | A1 | 5/2009 | Nuspl et al. | |
| 2009/0233096 | A1 | 9/2009 | Schall et al. | |
| 2010/0283012 | A1 | 11/2010 | Hibst et al. | |
| 2010/0301281 | A1 | 12/2010 | Hibst et al. | |
| 2011/0037032 | A1 | 2/2011 | Hibst et al. | |
| 2011/0049443 | A1 | 3/2011 | Hibst et al. | |
| 2011/0084238 | A1 | 4/2011 | Hibst et al. | |
| 2011/0147671 | A1 | 6/2011 | Bramnik et al. | |
| 2011/0272639 | A1 | 11/2011 | Bramnik et al. | |

FOREIGN PATENT DOCUMENTS

| CN | 1547273 A | 11/2004 |
|---|---|---|
| CN | 101369653 A * | 2/2009 |
| DE | 10 2005 012 640 | 9/2006 |
| DE | 10 2005 015 613 | 10/2006 |
| WO | WO 2004/082047 A2 | 9/2004 |
| WO | 2005 062404 | 7/2005 |
| WO | 2006 057146 | 6/2006 |

OTHER PUBLICATIONS

Machine Translation of CN 101369653.*
International Search Report Issued Nov. 8, 2010 in PCT/EP10/053326 Filed Mar. 16, 2010.
U.S. Appl. No. 13/379,048, filed Dec. 19, 2011, Schroedle, et al.

* cited by examiner

*Primary Examiner* — Mark Kopec
*Assistant Examiner* — Haidung Nguyen
(74) *Attorney, Agent, or Firm* — Oblon, McClelland, Maier & Neustadt, L.L.P.

(57) ABSTRACT

The present invention relates to a process for the preparation of compounds of general formula (I) $Li_{a-b}M_b^1Fe_{1-c}M_c^2P_{d-e}M_e^3O_x$, wherein Fe has the oxidation state +2 and $M^1$, $M^2$, $M^3$, a, b, c, d, e and x are: $M^1$: Na, K, Rb and/or Cs, $M^2$: Mn, Mg, Al, Ca, Ti, Co, Ni, Cr, V, $M^3$: Si, S, F a: 0.8-1.9, b: 0-0.3, c: 0-0.9, d: 0.8-1.9, e: 0-0.5, x: 1.0-8, depending on the amount and oxidation state of Li, $M^1$, $M^2$, P, $M^3$, wherein compounds of general formula (I) are neutrally charged, comprising the following steps (A) providing a mixture comprising at least one lithium-comprising compound, at least one iron-comprising compound, in which iron has the oxidation state 0, and at least one $M^1$-comprising compound, if present, and/or at least one $M^2$-comprising compound, if present, and/or least one $M^3$-comprising compound, if present, and at least one compound comprising at least one phosphorous atom in oxidation state +5, and (B) heating the mixture obtained in step (A) at a temperature of 100 to 500° C. and at an autogeneous pressure to obtain a compound of general formula (I).

9 Claims, 1 Drawing Sheet

SYNTHESIS OF LITHIUM-IRON-PHOSPHATES UNDER HYDROTHERMAL CONDITIONS

The present invention relates to a process for the preparation of compounds comprising lithium, iron and phosphate-anions, to a process for the preparation of mixtures comprising these compounds and at least one electrically conducting material, to the compounds and the mixtures, preparable by these processes and the use of these compounds and mixtures for the preparation of cathodes of lithium ion batteries.

Processes for the preparation of LiFePO$_4$ are already known from the prior art.

US 2003/0082454 A1 discloses a method for preparing LiFePO$_4$ by mixing Li$_2$CO$_3$ or LiOH H$_2$O, Fe(CH$_3$CO$_2$)$_2$ and NH$_4$H$_2$PO$_4$H$_2$O. The solid mixture is calcinated at 300 to 350° C., in order to eliminate NH$_3$, H$_2$O and CO$_2$. The mixture is subsequently further processed under argon for 24 hours at 800° C. This document further mentions the method of preparing LiFePO$_4$ based material by calcination of a milled mixture comprising Li$_2$C$_2$O$_4$, LiH$_2$PO$_4$ and Fe(C$_2$O$_4$).2H$_2$O.

U.S. Pat. No. 6,702,961 B2 also discloses a method for the preparation of LiFePO$_4$ by pelletising a milled mixture consisting of FePO$_4$, Li$_2$CO$_3$ and carbon, followed by calcination at 700° C. for 8 hours in an inert atmosphere.

The abstract of CN 1547273 A discloses a method for the preparation of LiFePO$_4$ by calcination of a milled and subsequently tablettized mixture of Li$_2$CO$_3$, FeC$_2$O$_4$.2H$_2$O and (NH$_4$)$_2$HPO$_4$ with the addition of carbon under microwave radiation.

DE 10 2005 015613 A1 and DE 10 2005 012 640 A1 disclose that LiFePO$_4$ can be obtained by hydrothermal treatment of an aqueous mixture comprising Fe(II)SO$_4$.7H$_2$O, H$_3$PO$_4$ and LiOH H$_2$O under nitrogen at 160° C. for 10 hours. During said hydrothermal treatment the desired LiFePO$_4$ precipitates from the aqueous mixture. No component of the reaction mixture is reduced or oxidized.

WO 2006/057146 A2 discloses that LiFePO$_4$ can be obtained by melting a mixture comprising Fe(II)O, P$_2$O$_5$ and LiOH at 1100° C. under argon, followed by milling.

The processes for the preparation of LiFePO$_4$ according to the prior art bear the drawback that an additional reducing agent like carbon has to be added to the reaction mixture or that the calcination step has to be conducted in a reducing atmosphere. Because the added carbon acts as a reducing agent only at high reaction temperatures, high calcination temperatures are necessary which lead to a material with large crystal grains and with a broad particle size distribution.

Other disadvantages are that if solid compounds like Li$_2$CO$_3$ and Fe$_2$O$_3$ are mixed in solid phase, it is difficult to obtain a mixture having a homogenous dispersion of the different ions throughout the whole mixture. In addition, carbon containing reducing agents show the disadvantage that their reducing power is not independent from the amount in which they are used, and therefore it is not easy to foresee which amount of carbon containing reducing agent is needed for the reduction and which amount can be used as electrically conducting material.

The object of the present invention is to provide a process for the preparation of lithium-iron-phosphate which makes it possible to obtain these compounds in a very homogenously mixed and crystalline state. In addition, it is an object of the present invention to provide a process for the preparation of the mentioned compounds which can be conducted easily and in only two reaction steps. Moreover, it is a preferred object of the present invention to provide a process for the preparation of lithium-iron-phosphate, in which no calcination step is necessary at all. It is another object to provide a process in which only the desired compound is obtained without any disturbing side products making any purification and/or washing steps unnecessary. It is a further object to obtain a more finely dispersed material with a very narrow size distribution of the crystallites, supplying improved Li-ion diffusivity in the charging and discharging of a Li-ion battery, in order to improve the Li-ion diffusivity and therewith the power characteristics and additionally to increase the capacity of a Li-ion battery.

These objects are achieved by a process for the preparation of compounds of general formula (I)

$$\text{Li}_{a-b}\text{M}_b^1\text{Fe}_{1-c}\text{M}_c^2\text{P}_{d-e}\text{M}_e^3\text{O}_x \quad (I),$$

wherein Fe has the oxidation state +2 and M$^1$, M$^2$, M$^3$, a, b, c, d, e and x are:

M$^1$: Na, K, Rb and/or Cs,
M$^2$: Mn, Mg, Al, Ca, Ti, Co, Ni, Cr, V,
M$^3$: Si, S, F
a: 0.8-1.9,
b: 0-0.3,
c: 0-0.9,
d: 0.8-1.9,
e: 0-0.5,
x: 1.0-8, depending on the amount and oxidation state of Li, M$^1$, M$^2$, P, M$^3$, wherein compounds of general formula (I) are neutrally charged, comprising the following steps (A) providing a mixture comprising at least one lithium-comprising compound, at least one iron-comprising compound, in which iron has the oxidation state 0, and at least one M$^1$-comprising compound, if present, and/or at least one M$^2$-comprising compound, if present, and/or least one M$^3$-comprising compound, if present, and at least one compound comprising at least one phosphorous atom in oxidation state +5, and (B) heating the mixture obtained in step (A) at a temperature of 100 to 500° C. and at an autogeneous pressure to obtain a compound of general formula (I).

In a preferred embodiment, M$^1$, M$^2$, M$^3$, a, b, c, d, e and x have the following meanings:

M$^1$: Na,
M$^2$: Mn, Mg, Al, Ca, Ti, Co, Ni,
M$^3$: Si, S, F,
a: 0.6-1.6, particularly preferred 0.9-1.3,
b: 0-0.1,
c: 0-0.6, particularly preferred 0-0.3
d: 0.6-1.6, particularly preferred 0.9-1.3
e: 0-0.3, particularly preferred 0-0.1
x: 2-6, depending on the amount and oxidation state of Li, M$^1$, M$^2$, P, M$^3$, wherein compounds according to general formula (I) are neutrally charged.

For example, in a very preferred embodiment, M$^1$, M$^2$ and M$^3$ are absent, in order to have a neutrally charged compound of general formula (I) LiFePO$_4$, in which Fe is in oxidation state +2. Therefore, in a very preferred embodiment, the process according to the present invention is conducted in order to obtain the compound of formula LiFePO$_4$.

In further preferred embodiments, M$^1$, being for example Na, is present in an amount of up to 10 mol %, in respect of the sum of Li and M$^1$. In another preferred embodiment, M$^2$, being for example Mn, is present in an amount of up to 30 mol %, in respect of the sum of iron (II) and M$^2$ present in the compound. In another preferred embodiment, M$^3$, being for example Si, is present in an amount of up to 10 mol %, in respect of the sum of phosphorous and $M^3$.

Process steps (A) and (B) are explained in the following in more detail:

Step (A):

Step (A) of the process according to the present invention comprises providing a mixture comprising at least one lithium-comprising compound, at least one iron-comprising compound, in which iron has the oxidation state 0, and at least one $M^1$-comprising compound, if present, and/or at least one $M^2$-comprising compound, if present, and/or least one $M^3$-comprising compound, if present, and at least one compound comprising at least one phosphorous atom in oxidation state +5.

In general, all Li-, $M^1$-, $M^2$-, $M^3$- and Fe(0)-comprising compounds known to a person having ordinary skill in the art which are able to be incorporated in an essentially aqueous mixture in step (A) of the process can be used in the process according to the present invention.

The Li-comprising compound in step (A) is preferably chosen from the group consisting of lithium hydroxide LiOH, lithium hydroxide-hydrate $LiOH.H_2O$, lithium acetate LiOAc, lithium carbonate $Li_2CO_3$, lithium-phosphates. -phosphites, -hypophosphites, like $LiH_2PO_4$, $Li_2HPO_4$, $Li_3PO_4$, $LiH_2PO_3$, $Li_2HPO_3$, and/or $LiH_2PO_2$, and mixtures thereof. In a very preferred embodiment, lithium hydroxide LiOH and/or lithium hydroxide-hydrate $LiOH.H_2O$ and/or lithium carbonate $Li_2CO_3$ are used as lithium-comprising compounds in step (A) of the process according to the present invention. Two particularly preferred lithium-comprising compounds are lithium hydroxide LiOH and lithium hydroxide-hydrate $LiOH.H_2O$.

The at least one lithium-comprising compound is added to the mixture in step (A) in the process according to the present invention in a concentration of in general 0.04 to 3 mol Li/L, preferably 0.2 to 2.0 mol Li/L, particularly preferred 0.3 to 1.5 mol Li/L, based on the whole reaction mixture in each case.

In general, all iron-comprising compounds in which iron has the oxidation state 0, known to a person having ordinary skill in the art can be used in the process according to the present invention, which are able to be incorporated in a preferably essentially aqueous mixture in step (A) of the process.

In a preferred embodiment of the process according to the present invention, the at least one iron comprising compound in which iron has the oxidation state 0 is chosen from the group consisting of elemental iron, alloys of iron with at least one further metal, steels and mixtures thereof.

In a particularly preferred embodiment, the at least one iron comprising compound in which iron has the oxidation state 0 is elemental iron, for example as powder, pellets or mixtures thereof. In a very preferred embodiment elemental iron is used as powder.

The present invention therefore also relates to the process according to the present invention, wherein the at least one iron comprising compound in which iron has the oxidation state 0 is elemental iron.

In a another embodiment, the iron-comprising compound in which iron has the oxidation state 0 can be chosen from the group consisting of iron-carbonyl-compounds, wherein CO is present as a ligand, for example chosen from the group consisting of $Fe(CO)_5$, $Fe_2(CO)_9$, $Fe_3(CO)_{12}$ and mixtures thereof.

Preferably used elemental iron in powdery form can be obtained by processes known to the skilled artisan, for example by decomposition reaction of iron-carbonyl-compounds, for example chosen from the group consisting of $Fe(CO)_5$, $Fe_2(CO)_9$, $Fe_3(CO)_{12}$ and mixtures thereof, particularly preferred $Fe(CO)_5$.

The at least one iron-comprising compound is added to the mixture in step (A) in the process according to the present invention in a concentration of in general 0.04 to 4.0 mol Fe/L, preferably 0.1 to 2.0 mol Fe/L, particularly preferred 0.2 to 1.5 mol Fe/L, based on the whole reaction mixture in each case.

In a preferred embodiment of the process according to the present invention, the mixture which is provided in step (A) additionally comprises at least one iron-comprising compound, in which iron has the oxidation state +3.

In general, all iron-comprising compounds in which iron has the oxidation state +3, known to a person having ordinary skill in the art, can be used in this preferred embodiment of the process according to the present invention, which are able to be incorporated in a preferably essentially aqueous mixture in step (A) of the process. According to the present invention, a single iron-comprising compound in which iron has the oxidation state +3, or a mixture of different iron-comprising compounds in which iron has the oxidation state +3 can be used. It is also possible that an iron-comprising compound is used in which both, iron in oxidation state +2 and +3 is present, like for example $Fe_3O_4$. It is also possible that a mixture of different iron-comprising compounds is used comprising one compound in which iron has the oxidation state +3 and another compound in which iron has the oxidation state +2.

In a particularly preferred embodiment, the iron-comprising compound in which iron has the oxidation state +3 is chosen from the group consisting of iron (II,III)-oxide, iron (III)-oxide, iron (III)-oxide hydroxide, or iron(III)-hydroxide, for example $Fe_3O_4$, alpha-$Fe_2O_3$, gamma-$Fe_2O_3$, alpha-FeOOH, beta-FeOOH, gamma-FeOOH and $Fe(OH)_3$. Preferred are the alpha-, beta- and gamma-modification of iron(III)-oxide hydroxide (FeOOH) and $Fe(OH)_3$.

The optionally added iron-comprising compound, in which iron has the oxidation state +3, has in general a BET surface, measured according to methods known to a person having ordinary skill in the art, of at least 5 $m^2/g$, preferably at least 50 $m^2/g$, more preferably at least 150 $m^2/g$. The BET surface is in general not larger than 1000 $m^2/g$. If iron-comprising compounds, in which iron has the oxidation state +3, are used having a very high BET surface, the reaction time of the process can be decreased, giving rise to a process according to the present invention, which is faster and more economic than the processes of the prior art.

The at least one optionally added iron-comprising compound is added to the mixture in step (A) in the process according to the present invention in a concentration of in general 0.04 to 4.0 mol Fe/L, preferably 0.1 to 2.0 mol Fe/L, particularly preferred 0.2 to 1.5 mol Fe/L, based on the whole reaction mixture in each case.

The at least one $M^1$-comprising compound, if present, is preferably chosen from the group consisting of sodium hydroxide NaOH, sodium acetate NaOAc, sodium carbonate $Na_2CO_3$, and mixtures thereof. In a very preferred embodiment, sodium hydroxide NaOH and/or sodium carbonate $Na_2CO_3$ are used as sodium-comprising compounds in step (A) of the process according to the present invention.

The at least one $M^2$-comprising compound, if present, is preferably chosen from compounds having the required cation and an anion chosen from hydroxide, acetate, oxide, carbonate, halogenide, like fluoride, chloride, bromide, iodide, nitrate, and mixtures thereof. In a very preferred embodiment, the anion of the at least one $M^2$-comprising compound is acetate, oxide, hydroxide, carbonate, nitrate, or mixtures thereof.

The at least one $M^3$-comprising compound, if present, is preferably chosen from $H_2SO_4$, $(NH_4)HSO_4$, $(NH_4)_2SO_4$, $LiHSO_4$, $Li_2SO_4$, finely divided $SiO_2$, e.g. in form of a sol, $H_4SiO_4$, Li-silicate, $NH_4F$, LiF, HF, polycarbon monofluoride, polycarbon fluoride, poly(carbon monofluoride), graphite fluoride, $Li_2SiF_6$, $(NH_4)_2SiF_6$ and mixtures thereof.

$M^1$-, $M^2$-, and/or $M^3$-comprising compounds are added to the preferably essentially aqueous mixture, if present, in amounts, in which they are present in compounds of formula (I). A person having ordinary skill in the art knows how to calculate the required amount.

In a preferred embodiment of the process according to the present invention, the mixture which is provided in step (A) additionally comprises at least one reducing agent which is oxidized to at least one compound comprising at least one phosphorous atom in oxidation state +5.

This preferred embodiment of the process according to the present invention shows the advantage that the oxidation product of this reducing agent gives rise to $PO_4^{3-}$-anions, which are needed in order to obtain the $PO_4^{3-}$-comprising compound of general formula (I). In this embodiment, less compound comprising at least one phosphorous atom in oxidation state +5 has to be added, compared to the embodiment, wherein no compound comprising at least one phosphorous atom in oxidation state +5 is added.

In a particularly preferred embodiment, the at least one reducing agent that is oxidized to at least one compound comprising at least one phosphorous atom in oxidation state +5, is carbon free. According to the present invention, carbon free means that no carbon atoms are present in the phosphorous-containing reducing agent.

In a further particularly preferred embodiment, the at least one reducing agent which is oxidized to at least one compound comprising at least one phosphorous atom in oxidation state +5 is chosen from the group consisting of $H_3PO_3$, $(NH_4)H_2PO_3$, $(NH_4)_2HPO_3$, $H_3PO_2$, $(NH_4)H_2PO_2$, $LiH_2PO_3$, $Li_2HPO_3$, $LiH_2PO_2$ and mixtures thereof. In a particularly preferred embodiment $H_3PO_3$, $(NH_4)H_2PO_3$, $(NH_4)_2HPO_3$ are used, a very preferred reducing agent is $H_3PO_3$.

The at least one reducing agent which is oxidized to at least one compound comprising at least one phosphorous atom in oxidation state +5 is optionally added to the mixture in step (A) in the process according to the present invention in a concentration of in general 0.04 to 2.0 mol P/L, preferably 0.1 to 1.3 mol P/L, particularly preferred 0.15 to 1.0 mol P/L, based on the whole reaction mixture in each case.

In this embodiment of the present application the mixture which is provided in step (A) comprises at least one compound comprising at least one phosphorous atom in oxidation state +5 and at least one reducing agent, which is oxidized to at least one compound comprising at least one phosphorous atom in oxidation state +5. In this embodiment of the process according to the present application, $PO_4^{3-}$ that is obtained from the at least one compound comprising at least one phosphorous atom in oxidation state +5 does not need to be present in an amount high enough to be the complete amount of phosphate-anion of the compound of general formula (I), because, in this embodiment, at least one compound having at least one phosphorous atom in oxidation stage +5 is also obtained as oxidation product of the optionally added reducing agent. This at least one reducing agent which is oxidized to at least one compound comprising at least one phosphorous atom in oxidation state +5 is, in this embodiment, the second source of $PO_4^{3-}$-anions, which have to be incorporated into the compound of general formula (I).

In step (A) of the process according to the present invention, at least one compound comprising at least one phosphorous atom in oxidation state +5 is added. In general, all compounds known to the skilled artisan comprising at least one phosphorous atom in oxidation state +5 can be added in step (A) of the process according to the present invention.

Preferred compounds comprising at least one phosphorous atom in oxidation state +5 which are added in step (A) are chosen from the group consisting of $H_3PO_4$, $(NH_4)H_2PO_4$, $(NH_4)_2HPO_4$, $(NH_4)_3PO_4$, $Li_3PO_4$, $LiH_2PO_4$, $Li_2HPO_4$ and mixtures thereof. Particularly preferred are $H_3PO_4$, $(NH_4)H_2PO_4$, $(NH_4)_2HPO_4$ and mixtures thereof, very preferred is $H_3PO_4$.

The at least one compound comprising at least one phosphorous atom in oxidation state +5 is added to the mixture in step (A) in the process according to the present invention in a concentration of in general 0.04 to 2.0 mol P/L, preferably 0.1 to 1.3 mol P/L, particularly preferred 0.15 to 1.0 mol P/L, based on the whole reaction mixture in each case.

In general the molar ratio between the at least one compound comprising at least one phosphorous atom in oxidation state +5 and the sum of at least one iron-compound comprising iron in oxidation state 0 and optionally present iron in oxidation state +3 is 1:2 to 2:1, preferably 1:1.5 to 1.5:1, more preferably 1:1.2 to 1.2:1, most preferably about 1:1.

If compounds are used in the process according to the present invention that bear two functionalities in respect of the present process, like for example compounds that comprise a lithium-cation and a $PO_4^{3-}$- or $PO_3^{3-}$-anion, the amounts of the compounds, which are introduced into the reaction mixture, are adjusted in a way that all necessary components are present in the reaction mixture in amounts that are suitable for obtaining the compound according to general formula (I). A person having ordinary skill in the art does know how to calculate these amounts.

In a further embodiment of the process according to the present invention, in addition to at least one iron-comprising compound, in which iron has the oxidation state 0, in addition to at least one compound comprising at least one phosphorous atom in oxidation state +5 and in addition to the optionally added at least one reducing agent which is oxidized to at least one compound comprising at least one phosphorous atom in oxidation state +5, at least one additional reducing agent is added to the mixture in step (A) of the process according to the present invention. This additional reducing agent may also be carbon-free or may contain carbon.

The optionally added at last one additional reducing agent is preferably chosen from hydrazine or derivatives thereof, hydroxyl amine or derivatives thereof, reducing sugars, like glucose, saccharose (succhrose) and/or lactose, alcohols like aliphatic alcohols having 1 to 10 carbon atoms, like methanol, ethanol, propanols, for example n-propanol or iso-propanol, butanols, for example n-butanol, iso-butanol, ascorbic acid, and compounds comprising easily oxidisable double bonds, and mixtures thereof.

Examples of derivatives of hydrazine are hydrazine-hydrate, hydrazine-sulfate, hydrazine-dihydrochlorid and others. An example of a derivative of hydroxyl amine is hydroxyl amine-hydrochloride. Particularly preferred carbon-free reducing agents which are not oxidized to at least one compound comprising at least one phosphorous atom in oxidation state +5 are hydrazine, hydrazine-hydrate, hydroxyl amine or mixtures thereof.

The at least one reducing agent, which is optionally added in step (A) of the process according to the present invention, is on the one hand by nature not able to deliver $PO_4^{3-}$-anions as oxidation products which can be incorporated into the compound of general formula (I). In this case, the amount and the concentrations of the at least one compound comprising at least one phosphorous atom in oxidation state +5, which is added in step (A), and the at least one reducing agent which is oxidized to at least one compound comprising at least one phosphorous atom in oxidation state +5, which is optionally added in step (A), have to be adjusted accordingly. A person having ordinary skill in the art does know how the respective amounts have to be calculated.

The at least one additional reducing agent is optionally added to the mixture in step (A) in the process according to the present invention in a concentration which depends strongly on the reducing power and reducing potential of this agent. A person having ordinary skill in the art does know how the respective amount has to be calculated.

In another embodiment, if a combination of at least one compound comprising at least one phosphorous atom in oxidation stage +5, preferably $H_3PO_4$, and at least one reducing agent which is oxidized to a compound comprising at least one phosphorous compound in oxidation stage +5, preferably $H_3PO_3$, is added in step (A) of the process according to the present invention, this combination is preferably added in a ratio, for example, $H_3PO_3/H_3PO_4$, which is larger than the ratio that is necessary to obtain the desired compound according to general formula (I), to overcome oxidative influences within the synthesis route, e.g. within the preparation of the mixture in the presence of oxygen and/or within the optional calcination of the dried material in the presence of oxygen impurities. A person having ordinary skill in the art does know how to calculate the stoichiometric amounts of the components in the mixture of step (A) according to the present invention.

In a preferred embodiment, the at least one lithium-comprising compound, the at least one iron-comprising compound, in which iron has the oxidation state 0, and the at least one compound comprising at least one phosphorous atom in oxidation state +5, are added to the essentially aqueous mixture in amounts that are adjusted in a way that the stoichiometry according to general formula (I) is obtained. A person having ordinary skill in the art does know how to calculate the necessary amounts.

In another preferred embodiment of the present invention, the at least one lithium-comprising compound is added in an amount that is ≥1% by weight, preferably ≥2% higher than the stoichiometric amount according to general formula (I).

In a further preferred embodiment of the present invention, the at least one lithium comprising compound is added in an amount that is less than 20% by weight, preferably less than 15% by weight, in particular less than 10% by weight higher than the stoichiometric amount according to general formula (I).

In one embodiment of the process according to the present invention the components which are present in the mixture that is provided in step (A) are mixed in dry state by intimately milling. A person having ordinary skill in the art does know how this intimate milling can be obtained and which apparatuses like mills can be used. The milled components are than dissolved or dispersed in a suitable amount of solvent or dispersant, being preferably water.

In another embodiment of step (A) of the process according to the present invention, the components are mixed by subsequent dissolving or dispersing them in the solvent or dispersant, preferably in water.

The mixture which is provided in step (A) of the process according to the present invention is in a preferred embodiment essentially aqueous. The wording "essentially aqueous" in this invention has the meaning that more than 50% by weight, preferably more than 65% by weight, particularly preferably more than 80% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added in step (A) of the process according to the present invention as additional reducing agent and/or as additional solvent.

In a very preferred embodiment, the solvent that is used in step (A) of the process according to the present invention is water without any additional solvents. In the context of the present invention the wording "without any additional solvents" means that in the very preferred embodiment that water is used as sole solvent, solvents other than water are present in the reaction mixture in an amount of less than 2% by weight, preferably less than 1% by weight, more preferably less than 0.15% by weight.

The order, in which the different components are added to the solvent or mixture of solvents in step (A), is not determined. In a preferred embodiment, the lithium-comprising compound is added first to the solvent, the at least one compound having at least one phosphorous atom having the oxidation state +5, and optionally the at least one reducing agent which is oxidized to at least one compound comprising at least one phosphorous atom in oxidation state +5, and optionally the at least one additional reducing agent, are added subsequently. The at least one iron-comprising compound, in which iron has the oxidation state 0 is preferably added last.

In a preferred embodiment of the present invention, the mixture obtained from step (A) of the process according to the present invention is an essentially aqueous solution or dispersion of at least one lithium-comprising compound, at least one iron-comprising compound, in which iron has the oxidation state 0, at least one compound comprising at least one phosphorous atom in oxidation state +5, optionally in combination with at least one reducing agent that is oxidized to at least one compound comprising at least one phosphorous atom in oxidation state +5.

When conducted in an essentially aqueous way, step (A) can be conducted in all suitable reactors that are known to a person skilled in the art, for example an autoclave. Step (A) can be conducted continuously or discontinuously.

The temperature, under which step (A) of the process according to the present invention is conducted in an essentially aqueous way is 10 to 120° C., preferably 15 to 100° C., particularly preferably 20 to 30° C., for example room temperature. If temperatures higher than 100° C. are used, the reaction mixture has to be present in a pressure-resistant reactor, because of the boiling point of water. To increase the homogeneity of the mixture, mixing is optionally conducted at elevated temperature and optionally under the application of shearing force, for example by the use of an ultrathurrax.

In a preferred embodiment the mixture is stirred in step (A) for a time of 0.05 to 80 hours, particularly preferred 0.1 to 20 hours, for example 0.5 to 2 hours. The pH-value of the reaction mixture that is obtained in step (A) of the process according to the present invention depends in general on the at least one iron-comprising compound in which iron has the oxidation state 0 that is used and can be basic, neutral or acidic.

Step (A) of the process according to the present invention can be conducted under air or under an inert atmosphere.

Examples of inert gases are nitrogen, noble gases like helium or argon. In a preferred embodiment, step (A) is conducted under air or under a nitrogen atmosphere.

Oxidation of most the $Fe^0$ to $Fe^{2+}$ is in general conducted in step (B) of the process according to the present invention. It is also possible that oxidation immediately starts in step (A) after addition of all components. It is further possible that oxidation starts after the aqueous mixture is heated to an increased temperature of 40 to 100° C., preferably 60 to 95° C.

Step (B):

Step (B) of the process according to the present invention comprises heating the mixture obtained in step (A) at a temperature of 100 to 500° C. and at an autogeneous pressure to obtain a compound of general formula (I).

Step (B) of the process according to the present invention is conducted in general at a temperature of 100 to 500° C., preferably at 180 to 400° C., most preferably at 220 to 320° C., for example at 250 to 300° C.

In one embodiment, step (B) of the process according to the present invention, can be conducted under hydrothermal conditions, wherein liquid water and water vapour are present in equilibrium, for example at a temperature of 100 to 374.15° C. Conducting step (B) of the process according to the present invention under hydrothermal conditions is preferred. Under hydrothermal conditions autogeneous pressures of 1 bar at 100° C. to 220 bar at 374° C. are present in the autoclave.

In another embodiment, step (B) of the process according to the present invention, is conducted under supercritical conditions, for example at a temperature of above 374.15° C. If step (B) of the process according to the present invention is conducted under supercritical conditions, the reaction mixture is present in a supercritical phase. In this embodiment, a pressure of 500 bar and more can be obtained, depending on the filling degree of the autoclave.

Step (B) of the process according to the present invention is conducted in general at a pressure of 1 to 200 bar, preferably at 2 to 150 bar, most preferably at 50 bis 100 bar. The pressure which is present in step (B) of the process according to the present invention can in one embodiment be set by the components of the reaction mixture, which is heated to the mentioned temperatures. For example, if water is the solvent of the reaction mixture prepared in step (A) and treated under hydrothermal conditions in step (B) of the process according to the present invention, it will evaporate at a temperature above 100° C. If step (B) is conducted in a sealed reactor, for example an autoclave, the pressure will rise in this reactor caused by the evaporating solvent. In a very preferred embodiment, step (B) of the process according to the present invention is conducted in an autoclave.

In a second embodiment of the process according to the present invention, the pressure of the reaction mixture in step (B) can be adjusted by the addition of at least one suitable gas to the reactor. This gas is preferably an inert gas, most preferably chosen from noble gases like argon, helium or mixtures, or nitrogen. In a preferred embodiment of the process according to the present invention, nitrogen is used as inert gas.

In a further embodiment of the process according to the present invention, the reaction mixture obtained from step (A) is placed in a suitable reactor, for example an autoclave, followed by adjusting the pressure in the reactor to a pressure above atmospheric pressure, being for example 1.5 to 20 bar, most preferably 5 to 15 bar, for example 10 bar. Subsequently, the reaction mixture is heated to a temperature which is desired, preferably as mentioned above, wherein the pressure rises at the same to the values as mentioned above.

Step (B) of the process according to the present invention can be conducted in any kind of reactor, which is suitable for the temperature and pressure of step (B). In a preferred embodiment, step (B) of the process according to the present invention is conducted in an autoclave. In a more preferred embodiment, step (B) of the process according to the present invention is conducted in the same reactor as step (A) of the process.

Step (B) of the process of the present invention can be conducted continuously or discontinuously.

Heating according to step (B) of the process according to the present invention is conducted as long as it is necessary to obtain a compound according to formula (I). In a preferred embodiment, step (B) of the process according to the present invention is conducted for 0.5 to 30 hours, preferably 4 to 20 hours, most preferably 8 to 16 hours, for example 12 hours.

In general, the reaction mixture is stirred in step (B) of the process according to the present in invention. In a preferred embodiment, the mixture is stirred in step (B) very rapidly, in order to obtain compounds of general formula (I), which are very homogeneous. The stirrer speed in step (B) is preferably 400 to 1200 rpm (rounds per minute), more preferably 600 to 100 rpm, for example 700 rpm. The stirrer speed in step (B) has a significant effect on the quality of the products obtained from the process according to the present invention. Suitable stirrers are known to a person having ordinary skill in the art, for example blade stirrer.

After step (B) of the process according to the present invention the product, at least one compound according to general formula (I), most preferably $LiFePO_4$, is obtained in the solvent, which has been applied in step (A) of the process. In a preferred embodiment of the process according to the present invention, water is used as the solvent. In the case that other compounds according to general formula (I) not being $LiFePO_4$ are prepared by the process according to the present invention, either solutions or emulsions are obtained in step (B) depending on the solubility of these compounds in the solvent. In the preferred case that $LiFePO_4$ is obtained in the process according to the present invention, an aqueous suspension of $LiFePO_4$ is obtained in step (B).

If an emulsion is obtained after step (B) of the process according to the present invention, which is preferred, this mixture has a basic, neutral or acidic pH-value, preferably a neutral pH-value of for example 6 to 8, particularly preferably about pH 7.

The present invention also relates to a compound according to general formula (I) as defined above, preparable by a process according to the present invention.

In a preferred embodiment of the process according to the present invention, the reaction mixture, which is obtained from step (B) is subjected to step (C), which is an optional separating step, in order to separate the compound according to general formula (I) from the reaction medium.

Step C:

In a preferred embodiment of the process according to the present invention, after step (B), the following step (C) is conducted:

(C) separating the compound of general formula (I) from the mixture obtained in step (B).

In general, all methods that are known to a person having ordinary skill in the art for separating solid materials from solution or emulsion can be used in step (C) of the process according to the present invention. Preferred methods are filtration, centrifugation, drying. In a preferred embodiment of step (C), the at least one compound of general formula (I) which is obtained in step (B) in, preferably aqueous, emulsion is separated in step (C) by filtration, preferably supported by application of increased or reduced pressure. A person having ordinary skill in the art does know how to conduct this.

In a further preferred embodiment of the process according to the present invention, after separation of the at least one compound of general formula (I) in solid form, this solids is washed, in order to obtain the at least one compound in essentially pure form. In respect of the process according to the present invention, "essentially pure" means that less than 5% by weight, preferably less than 2% by weight, more preferably less than 1% by weight compounds are present after washing that are not compounds of general formula (I).

In a preferred embodiment, washing is conducted with a suitable solvent, in which the at least one compound of general formula (I) is essentially insoluble. "Essentially insoluble" means that less than 5% by weight, preferably less than 2% by weight, more preferably less than 1% by weight of the at least one compound of general formula (I) is dissolved during the washing procedure.

In respect of the process according to the present invention, "essentially" means more than 90%, preferably more than 95%, more preferably more than 98%.

In a very preferred embodiment, washing in step (C) of the process according to the present invention is conducted with water. In a more preferred embodiment of the present invention, washing is conducted with several portions of water, instead of one complete portion of water. In general, washing is conducted as many times as necessary, in order to obtain the compound according to general formula (I) in essentially pure form. A method to determine the amount of water that is necessary to obtain an essentially pure compound is, for example, the conductivity of the compound, wherein an essentially pure compound shows a very low conductivity.

In a further preferred embodiment, the at least one compound that is obtained after step (C) of the process according to the present invention, is dried, in order to remove the solvent, preferably water. Drying can be conducted by any method known to a person having ordinary skill in the art, for example heating to a temperature of 40 to 150° C. In a further embodiment of the process according to the present invention, drying can be conducted under reduced pressure, for example at 400 to 900 mbar. Drying by heating can be conducted in any apparatus suitable for drying and known to the skilled artisan, for example in a hot-air cabinet or in any kind of furnaces.

Drying in step (C) of the present invention is conducted as long as essentially the whole amount of solvent, preferably water, is removed. A person having ordinary skill in the art does know, when essentially all solvent is removed, for example all solvent is removed if the compound of general formula (I) reaches a constant weight.

The solids that are obtained from step (C) of the process according to the present invention supply improved Li-ion diffusivity in the charging and discharging of a Li-ion battery containing them. By improving the Li-ion diffusivity the power characteristics and additionally the capacity of a Li-ion battery can be increased.

Therefore the present invention also relates to particles or agglomerates comprising at least one compound of general formula (I) obtainable/preparable by the process according to the present invention.

Because of the improved Li-ion diffusivity in the charging and discharging of a Li-ion battery, the particles or agglomerates comprising at least one compound according to general formula (I) preparable by the process according to the present invention are particularly suitable for the use for the preparation of a cathode of a lithium-ion battery or an electrochemical cell. Therefore the present invention also relates to the use of compounds of general formula (I) obtainable/preparable by the process according to the present invention for the preparation of a cathode of a lithium-ion battery or an electrochemical cell.

In addition, the present invention relates to a cathode for a lithium-ion battery, comprising at least one particle or agglomerates preparable to the process according to the present invention or at least one compound according to general formula (I) preparable by the process according to the present invention.

Step (D):

In one embodiment of the process according to the present invention, the solid compound obtained from step (C) is optionally calcinated at a calcination temperature of 300 to 1000° C. in an optional step (D) of the process according to the present invention.

Optional step (D) is preferably conducted at a calcination temperature of 375 to 1100° C., particularly preferably at a calcination temperature of 400 to 950° C., for example 450 to 850° C.

Calcination is in general conducted under an inert gas atmosphere. Examples of inert gases are nitrogen, technical nitrogen comprising traces of oxygen or noble gases like helium and/or argon. In a preferred embodiment, nitrogen is used in optional step (D) of the process according to the present invention. If technical nitrogen is used in optional step (D) of the present invention, this nitrogen can comprise traces of oxygen.

One advantage of the process according to the present invention is that calcination can be conducted under an inert atmosphere and no need exists to conduct optional step (D) under a reducing atmosphere according to the prior art. Based thereon the process according to the present invention can be conducted in a more time and cost saving way. The absence of a gaseous reducing agent, for example hydrogen, avoids the presence of explosive gaseous mixtures. If the nitrogen used in the calcination step comprises higher amounts of oxygen, it is possible to add reducing gases like CO or hydrogen to the oxygen comprising nitrogen.

Optional step (D) of the process according to the present invention is conducted for a time of 0.1 to 8 hours, preferably 0.5 to 3 hours. In a preferred embodiment of optional step (D), the calcination temperature is hold for a period of 0.1 to 2 hours, very preferably 0.5 to 1.5 hours, and at the end the temperature is decreased to room temperature.

The temperature of calcination has a significant impact onto the specific surface of the compound according to general formula (I). Low temperatures during calcination give normally rise to high specific surface area. High temperatures during calcination give usually rise to low specific surface area.

The particles or agglomerates that are obtained in step (D) of the process according to the present invention can optionally comprise further elements, for example carbon, that are optionally obtained by pyrrolysis of the additional reducing agent, for example, a sugar.

The process according to the present invention can be conducted continuously or discontinuously. In a preferred embodiment the process according to the present invention is conducted continuously. Suitable apparatuses for optional step (D) are known to the person having ordinary skill in the art. One example for a discontinuous or continuous calcination is a rotary furnace. In case of continuous calcination the residence time in a rotary furnace is based on the inclination and the rotating speed of the furnace. A person having ordinary skill in the art does know how a suitable residence time is adjusted in the rotary furnace. In a preferred embodiment the solid that is calcinated in step (D) of the process according to the present invention is moved during calcination, for example in a fluidized bed reactor or in a rotary furnace. The solid can also be stirred during calcination. The rotary furnace can comprise different temperature zones. For example, in a first zone the temperature is adjusted to a low temperature in order to drain the spray dried powder, whereas in another zone a higher calcination temperature is present. The speed of heating of the powder is depending on the temperatures in the different zones and on the speed with which the powder is moved in the furnace.

Optional step (D) of the process according to the present invention is in general conducted under a pressure that is suitable that preferably complete conversion into the desired products is obtained. In a preferred embodiment optional step (D) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

Depending on the composition of the electrode which can be prepared form the compound of general formula (I) and on the desired electrochemical properties of the resulting lithium-ion battery, it can be advantageous, according to the present invention, if the solid compound obtained from step (C) is mechanically treated prior to optional step (D) and/or if the solid compound obtained from step (D) is mechanically treated after step (D), in order to destroy the agglomerates into smaller and more dense agglomerates having the required size or into the primary particles. Suitable mills, compactors and/or rolls are known to a person having ordinary skill in the art. Examples are jet mills which supply very low abrasion, preferably under the use of nitrogen and/or air. For milling of the calcinated product also wet milling processes may be advantageous, for example by the use of a bead mill. Further suitable apparatuses are compactors and/or rollings.

The materials according to the present invention of general formula (I) preparable by the process according to the present invention are particularly suitable for the use for the preparation of a cathode of a lithium-ion battery or an electrochemical cell. Therefore the present invention also relates to the use of a particle or agglomerate or of compound of general formula (I) obtainable/preparable by the process according to the present invention for the preparation of a cathode of a lithium-ion battery or an electrochemical cell.

The present invention further relates to a cathode for a lithium-ion battery, comprising at least one particle or agglomerate compound according to general formula (I) obtain-able/preparable by the process according to the present invention. To obtain a cathode as mentioned above the compound according to general formula (I) is mixed with at least one electrically conducting material, described for example in WO 2004/082047.

Suitable electrically conducting materials are for example carbon black, graphite, carbon fibres, carbon nanofibres, carbon nanotubes or electrically conducting polymers. Typically 2.0 to 40% by weight of the at least one electrically conducting material are used together with the compound according to general formula (I) in the cathode. To obtain the cathode the electrically conducting material and the compound according to general formula (I) are mixed, optionally in the presence of an organic solvent and optionally in the presence of an organic binder, for example PVDF, and this mixture is optionally formed and dried. A temperature of 80 to 150° C. is applied in the drying step.

In a preferred embodiment at least a part of the at least one electrically conducting material or at least one precursor of an electrically conducting material is added during the preparation of compounds according to general formula (I) as mentioned above. In a preferred embodiment, at least a part of the at least one electrically conducting material or at least one precursor of an electrically conducting material is added to the mixture of the starting materials in the preparation of the compound according to general formula (I). The remaining part of the least one electrically conducting material or at least one precursor of an electrically conducting material, which has not been added during the preparation of compounds according to general formula (I), is added after this preparation.

Therefore, the present invention also relates to a process for the preparation of a mixture comprising at least one compound according to general formula (I) as defined above and at least one electrically conducting material comprising the following steps
(E) providing a mixture comprising at least one electrically conducting material or at least one precursor of an electrically conducting material, at least one lithium-comprising compound, at least one iron-comprising compound, in which iron has the oxidation state 0, and at least one $M^1$-comprising compound, if present, and/or at least one $M^2$-comprising compound, if present, and/or at least one $M^3$-comprising compound, if present, and at least one compound comprising at least one phosphorous atom in oxidation state +5, and
(F) heating the mixture obtained in step (E) at a temperature of 100 to 500° C. and an autogeneous pressure to obtain a mixture comprising at least one compound according to general formula (I) and at least one electrically conducting material.

In a preferred embodiment of this process according to the present invention, the mixture that is provided in step (E) is essentially aqueous. In a further preferred embodiment the mixture which is provided in step (E) additionally comprises at least one iron-comprising compound, in which iron has the oxidation state +3.

The lithium-, $M^1$, $M^2$ and/or $M^3$-comprising compounds, the iron-comprising compounds, ion which iron has the oxidation state 0, the at least one compound comprising at least one phosphorous atom in oxidation state +5, the optionally present at least one reducing agent which is oxidized to at least one compound comprising at least one phosphorous atom in oxidation state +5, the optionally present iron-comprising compound, in which iron has the oxidation state +3, the electrically conductive materials, the apparatuses and the process parameters of the steps (E) and (F) correspond to the ones described in respect of steps (A) and (B).

In a further preferred embodiment, the optionally added at least one reducing agent which is oxidized to at least one compound comprising at least one phosphorous atom in oxidation state +5 is chosen from the group consisting of $H_3PO_3$, $(NH_4)H_2PO_3$, $(NH_4)_2HPO_3$, $H_3PO_2$, $(NH_4)H_2PO_2$, $LiH_2PO_3$, $Li_2HPO_3$, $LiH_2PO_2$ and mixtures thereof.

In the process for the preparation of a mixture comprising at least one compound according to general formula (I) as defined above and at least one electrically conducting material, the electrically conducting material is chosen from the group consisting of carbon black, graphite, carbon fibres, carbon nanofibres, carbon nanotubes, electrically conducting polymers and mixtures thereof. The at least one electrically conducting material is in general added in step (E) of the process according to the present invention in an amount of 0.01 to 15% by weight, preferably 0.1 to 10% by weight, more preferably 0.2 to 8% by weight, based on the whole reaction mixture present in step (E) of the process according to the present invention.

If carbon black, graphite or substances essentially consisting of carbon are used as electrically conducting materials in step (E), these materials are preferably suspended in a mixture, preferably an essentially aqueous solution or dispersion, of the other components. This can be achieved by direct addition of these electrically conducting materials to the, preferably aqueous, mixture of the other components. Alternatively, carbon black, graphite or substances essentially consisting of carbon can be suspended in an aqueous solution of hydrogen peroxide, and this suspension can then be added to a solution or dispersion of one or more components as mentioned above. Treatment with hydrogen peroxide normally improves the wettability of carbon with water and makes it possible to obtain carbon containing suspensions having an improved stability, i.e. having a lower tendency for demixing. In addition the homogenous dispersion of the electrically conducting material in the mixture is improved. By further stirring and/or heating of the aqueous suspension the excess hydrogen peroxide is decomposed into water and oxygen in the catalytic presence of the Li-, Fe- and/or P-containing precursors.

In another embodiment, at least one surfactant can be added in step (E) of the process according to the present invention. Suitable surfactants are for example non-ionic surfactants, preferably ethylene oxide/propylene oxide block copolymers.

Step (G):

In a preferred embodiment of the process according to the present invention, after step (F), the following step (G) is conducted:

(G) separating the mixture comprising at least one compound according to general formula (I) as defined above and at least one electrically conducting material from the mixture obtained in step (F).

In general, all methods that are known to a person having ordinary skill in the art for separating solid materials from solution or emulsion can be used in step (G) of the process according to the present invention.

In principle, optional step (G) of the process according to the present invention can be conducted according to step (C) as described above. Therefore, the details and preferred embodiments which have been explained in respect of step (C) are also details and preferred embodiments of step (G) with the difference that in step (G) a mixture comprising at least one compound according to general formula (I) as defined above and at least one electrically conducting material is treated, whereas in step (C) at least one compound according to general formula (I) as defined above is treated.

Step (H):

In one embodiment of the process according to the present invention, the solid compound obtained from step (G) is calcinated at a calcination temperature of 300 to 1000° C. in an optional step (H) of the process according to the present invention.

In principle, optional step (H) of the process according to the present invention can be conducted according to step (D) as described above. Therefore, the details and preferred embodiments which have been explained in respect of step (D) are also details and preferred embodiments of step (H) with the difference that in step (H) a mixture comprising at least one compound according to general formula (I) as defined above and at least one electrically conducting material is treated, whereas in step (D) at least one compound according to general formula (I) as defined above is treated.

The present invention also relates to a mixture, comprising at least one compound according to general formula (I) as defined above and at least one electrically conducting material, preparable by a process comprising steps (E), (F), and optionally (G) and/or (H) as mentioned above. In contrast to materials according to the prior art, these mixtures according to the present invention show an improved dispersion of the at least one electrically conducting material within the agglomerates of the resulting material.

This improved C-dispersion leads to a highly electrically conductive percolation network of carbon within the cathode material powder according to the present invention and in addition to an improved electrical conductivity of the layer like electrode. The mixture comprising at least one compound according to general formula (I) and at least one electrically conducting material in general has BET surface area which is determined by the kind and the amount of the additional carbon within the mixture and may vary from 0.1 to 500 m$^2$/g.

Therefore, the present invention also relates to the use of a mixture as mentioned above or agglomerates comprising the mixture, comprising at least one compound according to general formula (I) as defined above and at least one electrically conducting material for the preparation of a cathode of a lithium-ion battery or an electrochemical cell.

The present invention also relates to a cathode for a lithium-ion battery, comprising a mixture or agglomerates comprising the mixture as mentioned above.

For the preparation of a cathode using the compound according to general formula (I) as mentioned above or a mixture comprising the compound according to general formula (I) or agglomerates as mentioned above and at least one electrically conducting material as mentioned above, in a preferred embodiment the following binders are used:

Polyethyleneoxide (PEO), cellulose, polyethylene, polypropylene, polytetrafluoroethyl-ene, polyacrylonitrile-methylmethacrylate, styrene-butadiene-copolymers, tetrafluoro-ethylene-hexyluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

The process according to the present invention is further illustrated by the following example:

EXAMPLES

Fe that is used in the examples is obtained by decomposition reaction of Fe(CO)$_5$.

Example 1

15.39 g (98%, 0.63 mol, Merck) LiOH are dissolved under stirring in 1320 mL of water. 69.0 g (85%, 0.60 mol, Bernd Kraft GmbH Duisburg, Germany) H$_3$PO$_4$ are added to the solution. The obtained solution is transferred to a 3.5 L autoclave with stirrer, and 32.51 g (0.58 mol, brand EQ, BASF SE) Fe are added subsequently. The pressure in the autoclave is set to 10 bar with nitrogen. The reaction mixture is stirred at room temperature for one hour and is then heated to 270° C. The temperature is held at 270° C. for 12 hours and is then lowered to room temperature.

Figure 1:
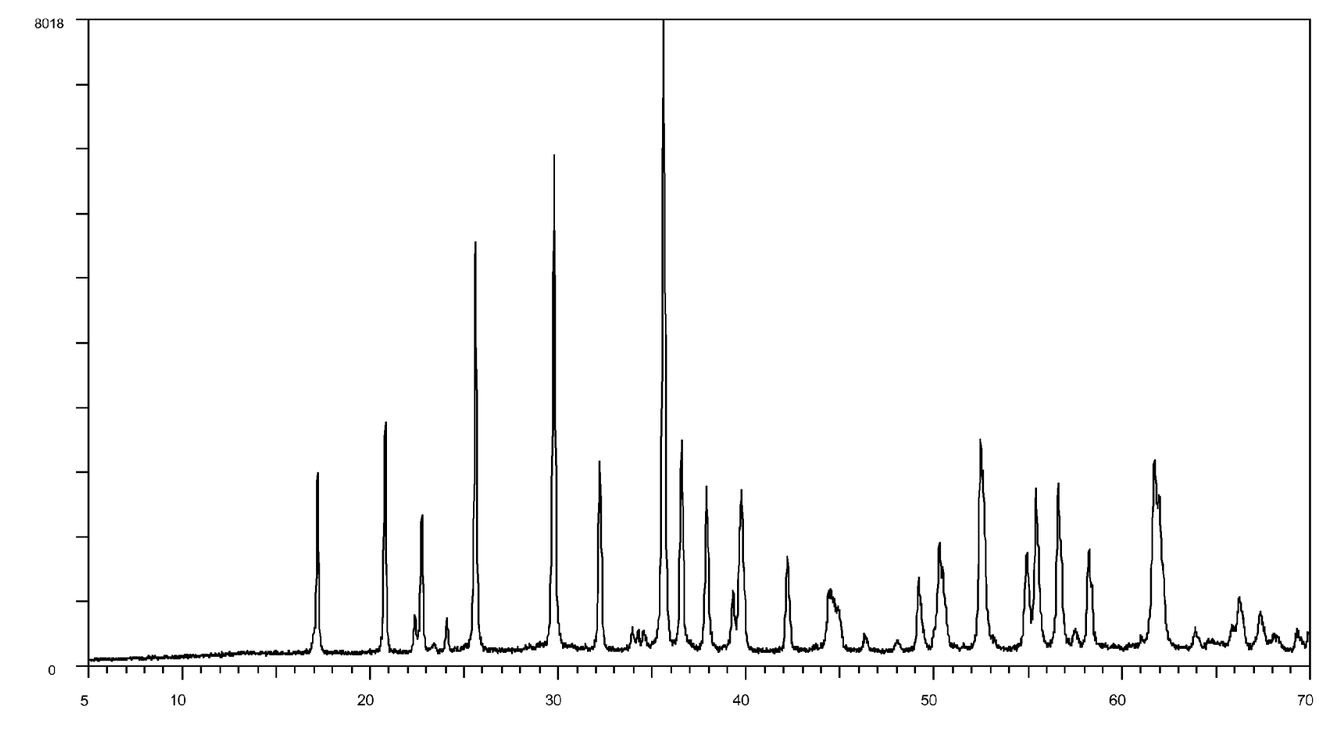

The reaction mixture is filtrated and LiFePO$_4$ obtained is washed and dried. Diffraction analysis of LiFePO$_4$ obtained in example 1 is shown in FIG. 1, wherein intensity of radiation is drawn on the y-axis and 2-theta is drawn on the x-axis. Conditions of this analysis are:
Step: 0.020°—Step time: 2.4 s—Temp.: 25° C. (Room)—Anode: Cu

Example 2

5LiOH+4Fe+FeOOH+5H$_3$PO$_4$→5LiFePO$_4$+7H$_2$O+7/2H$_2$ 15.39 g (98%, 0.63 mol, Merck) LiOH are dissolved under stirring in 1320 mL of water. 69.0 g (85%, 0.60 mol, Bernd Kraft GmbH Duisburg, Germany) H$_3$PO$_4$ and 10.97 g (Fe-content 50.9% by weight, 0.12 mol, Bayoxid EF300, specific BET-surface 236 m$^2$/g) FeOOH are added to the solution. The obtained solution is transferred to a 3.5 L autoclave with stirrer, and 27.92 g (0.50 mol, brand EQ, BASF SE) Fe are added subsequently. The pressure in the autoclave is set to 10 bar with nitrogen. The reaction mixture is stirred at room temperature for one hour and is then heated to 270° C. The temperature is held at 270° C. for 12 hours and is then lowered to room temperature.

The reaction mixture is filtrated and LiFePO$_4$ obtained is washed and dried.

Example 3

5LiOH+4Fe+FeOOH+5H$_3$PO$_4$→5LiFePO$_4$+7H$_2$O+7/2H$_2$ 15.39 g (98%, 0.63 mol, Merck) LiOH are dissolved under stirring in 1320 mL of water. 69.0 g (85%, 0.60 mol, Bernd Kraft GmbH Duisburg, Germany) H$_3$PO$_4$ and 10.97 g (Fe-content 50.9% by weight, 0.12 mol, Bayoxid EF300, specific BET-surface 236 m$^2$/g) FeOOH are added to the solution, a suspension A is obtained. 3 g carbon black (Timcal Super P Li, Timcal Deutschland GmbH, D-40212 Düsseldorf, Germany) are added to the water, wherein the carbon black swims on the surface. Subsequently, 150 ml aqueous H$_2$O$_2$-solution (30%, Merck GmbH, D-64293 Darmstadt, Germany) are added drop wise under stirring, wherein the carbon black disperses in water. The black, aqueous carbon black dispersion B obtained is added under stirring to the suspension A. The obtained solution is transferred to a 3.5 L autoclave with stirrer, and 27.92 g (0.50 mol, brand EQ, BASF SE) Fe are added subsequently. The pressure in the autoclave is set to 10 bar with nitrogen. The reaction mixture is stirred at room temperature for one hour and is then heated to 270° C. The temperature is held at 270° C. for 12 hours and is then lowered to room temperature. The reaction mixture is filtrated and LiFePO$_4$ obtained is washed and dried. Afterwards, the obtained LiFePO$_4$/C powder is calcined under N$_2$ atmosphere at 600° C. for 2 h.

The invention claimed is:

1. A process for preparing at least one compound of formula (I), the process comprising:
heating an essentially aqueous mixture comprising at least one lithium-comprising compound, at least one iron-comprising compound in which iron has the oxidation state 0, at least one compound comprising at least one phosphorous atom in oxidation state +5, and, optionally, at least one selected from the group consisting of an M$^1$-comprising compound, an M$^2$-comprising compound, and an M$^3$-comprising compound, at a temperature of 100 to 500° C. and at an autogeneous pressure to obtain the at least one compound of formula (I)

$$Li_{a-b}M_b^1Fe_{1-c}M_c^2P_{d-e}M_e^3O_x \quad (I),$$

wherein
Fe has the oxidation state +2,
M$^1$ is at least one selected from the group consisting of Na, K, Rb, and Cs,
M$^2$ is Mn, Mg, Al, Ca, Ti, Co, Ni, Cr, or V,
M$^3$ is Si, S, or F,
a is 0.8-1.9,
b is 0-0.3,
c is 0-0.9,
d is 0.8-1.9,
e is 0-0.5, and
x is 1.0-8, depending on an amount and oxidation state of Li, M$^1$, M$^2$, P, M$^3$, and
wherein compounds of formula (I) are neutrally charged.

2. The process of claim 1, wherein the mixture further comprises at least one iron-comprising compound, wherein iron has the oxidation state +3.

3. The process of claim 1, wherein the at least one iron comprising compound wherein iron has the oxidation state 0 is elemental iron.

4. The process of claim 1, wherein the mixture further comprises at least one reducing agent which is oxidized to at least one compound comprising at least one phosphorous atom in oxidation state +5.

5. Process according to claim 4, wherein the at least one reducing agent which is oxidized to at least one compound comprising at least one phosphorous atom in oxidation state +5 is at least one selected from the group consisting of H$_3$PO$_3$, (NH$_4$)H$_2$PO$_3$, (NH$_4$)$_2$HPO$_3$, H$_3$PO$_2$, (NH$_4$)H$_2$PO$_2$, LiH$_2$PO$_3$, Li$_2$HPO$_3$, and Li$_2$PO$_2$.

6. The process of claim 1, wherein the at least one compound comprising at least one phosphorous atom in oxidation state +5 is at least one selected from the group consisting of H$_3$PO$_4$, (NH$_4$)H$_2$PO$_4$, (NH$_4$)$_2$HPO$_4$, (NH$_4$)$_3$PO$_4$, Li$_3$PO$_4$, LiH$_2$PO$_4$, and Li$_2$HPO$_4$.

7. The process of claim 1, wherein the heating is conducted at a temperature of 180 to 350° C.

8. The process of claim 1, further comprising, after the heating:
separating the compound of formula (I) from a mixture obtained.

9. The process of claim 1, wherein the heating is conducted in an autoclave.

* * * * *